UNITED STATES PATENT OFFICE.

WILLIAM ADAMSON AND CHARLES F. A. SIMONIN, OF PHILADELPHIA, PENNSYLVANIA, ASSIGNORS TO WILLIAM ADAMSON.

IMPROVEMENT IN TREATING OFFAL, FLESH, ENTRAILS, &c., FOR PRESERVATION, MANURE, &c.

Specification forming part of Letters Patent No. 119,000, dated September 19, 1871; reissue No. 5,610, dated October 21, 1873; application filed October 8, 1873.

DIVISION A.

*To all whom it may concern:*

Be it known that we, WILLIAM ADAMSON and CHARLES F. A. SIMONIN, both of Philadelphia, county of Philadelphia, State of Pennsylvania, have invented an Improvement in Treating Flesh, Entrails, and Offal for Preservation, Manure, &c., of which the following is a specification:

Our invention consists in treating animal and fecal substances, garbage, &c., with hydrocarbon, substantially as described hereafter, so as to deprive them of the ingredients which induce putrescence, and obtain valuable products.

Oils and fats have been extracted from animal matter by the direct application of liquid hydrocarbons; but this necessarily involved a considerable waste of the fluid which is retained in the residuum after the fat has been extracted. The residuum, moreover, is deprived by the process of much of its ammoniacal properties, and is accordingly deteriorated in value as a manure.

Fertilizers have been prepared from offal and fish by passing air or gas, or gas charged with hydrocarbon and phenol vapors, through the mass, and subsequently drying with hot air. This differs from our invention, as the vapor we employ is unmixed with air or gas, is solely the product of the distillation of hydrocarbons, and the process is conducted in a close vessel.

Although different modes of carrying our invention into effect may be adopted, we prefer the following: The animal matter is placed on a perforated diaphragm, in a closed vessel, and beneath the diaphragm is introduced a supply of hydrocarbon, by preference such as is of a volatile character—benzine, benzole, gasoline, or naphtha, for instance—and this is vaporized by means of a steam-coil, or otherwise. The vapor rises, and, after permeating the mass of offal, passes off from the vessel to a condenser, from whence it is returned, in its original condition of a volatile liquid hydrocarbon, to the space in the vessel below the diaphragm, to be again vaporized; or the hydrocarbon may be permitted to pass into the vessel near the top, and through the animal matter until it reaches a point where it is again vaporized. The process is conducted under more or less pressure, determined by a weighted valve in the pipe through which the vapor passes to the condenser. The greater the pressure the more rapid and thorough will be the extraction of the fat. The extract, consisting of liquid hydrocarbon holding fatty and oily matter in solution, may be removed from time to time from the vessel through a suitable discharge-cock, and may be redistilled, in order to separate the fats from hydrocarbons; and this redistillation may, if desired, be conducted in the same vessel in which the extract is obtained.

We claim—

The extraction of animal oils and fats by hydrocarbon vapors in a closed vessel, substantially in the manner described.

In testimony whereof we have signed our names to this specification in the presence of two subscribing witnesses.

WILLIAM ADAMSON.
CHS. F. A. SIMONIN.

Witnesses:
WM. A. STEEL,
HARRY SMITH.